United States Patent

Uemura

[15] 3,653,012

[45] Mar. 28, 1972

[54] MAGNETIC HEAD WITH GAPS SPACED AS A FUNCTION OF THE DISTANCE BETWEEN RECORDED LINES OF INFORMATION

[72] Inventor: Saburo Uemura, Yokohama, Japan

[73] Assignee: Sony Corporation, Tokyo, Japan

[22] Filed: Oct. 2, 1970

[21] Appl. No.: 77,717

Related U.S. Application Data

[63] Continuation of Ser. No. 732,248, May 27, 1968, abandoned.

[30] Foreign Application Priority Data

May 31, 1967 Japan....................................42/35111

[52] U.S. Cl..............................340/174.1 P, 340/174.1 L
[51] Int. Cl..........................................G11b 5/86, G11b 5/02
[58] Field of Search...........346/74 M; 340/174.1 P, 174.1 A; 179/100.2 RE, 100.2 CA, 100.2 E; 324/70 B, 172

[56] References Cited

UNITED STATES PATENTS 2,332,573  10/1943  Hibschman et al.....................324/172
2,558,249   6/1951  Hewlett et al.........................340/174.1
2,804,499   8/1957  Botts......................................179/100.2
3,267,448   8/1966  Gonther.................................340/174.1
3,277,453  10/1966  Michel...................................179/100.2
3,402,350   9/1968  Shellabarger.........................179/100.2

Primary Examiner—Bernard Konick
Assistant Examiner—Vincent P. Canney
Attorney—Hill, Sherman, Meroni, Gross & Simpson

[57] ABSTRACT

An apparatus for the magnetic recording of gradient information wherein a magnetic gradient of given length is reproduced on a magnetic medium. A readout magnetic head is provided for sensing the recorded gradient information and a writing head is used to reproduce the gradient information onto an extended portion of a magnetic member containing the gradient information. Either the readout head or the writing head is provided with means for adjusting the distance between the two heads. The readout head and the writing head may be positioned opposed from one another so as to sense gradient information on a master copy of magnetic material and reproduce the gradient information on a magnetic member used for positioning machine tools or the like.

5 Claims, 8 Drawing Figures

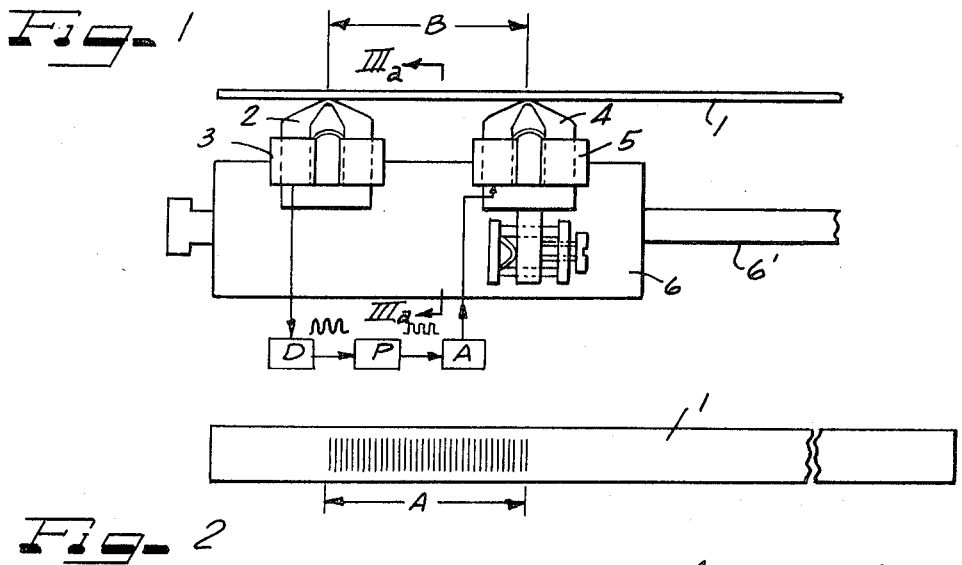
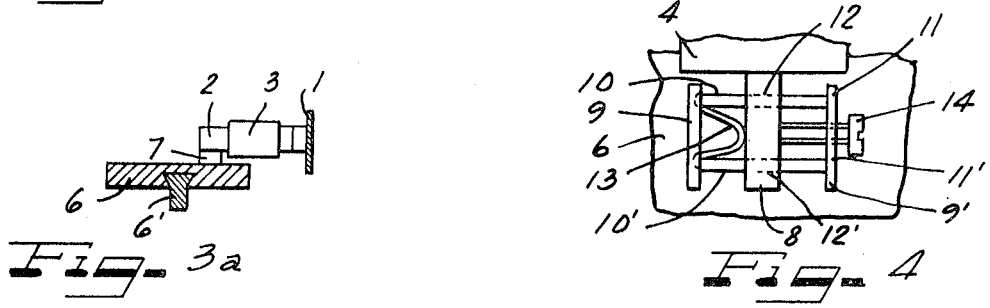
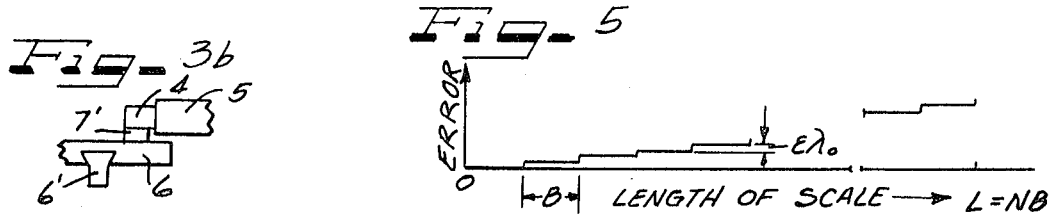
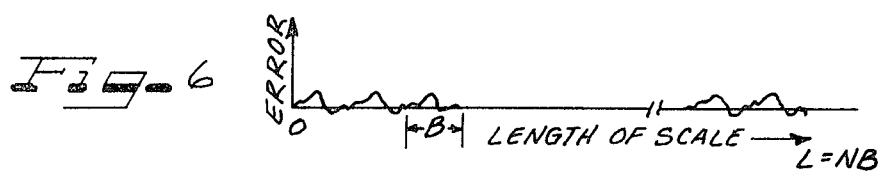
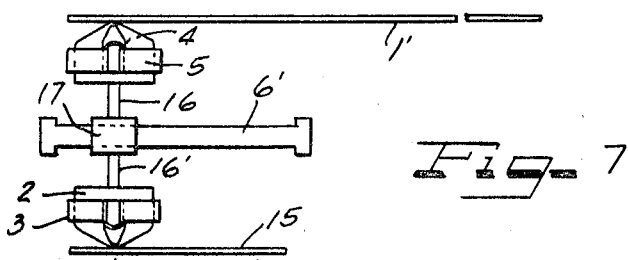
INVENTOR.
SABURO UEMURA 3,653,012

MAGNETIC HEAD WITH GAPS SPACED AS A FUNCTION OF THE DISTANCE BETWEEN RECORDED LINES OF INFORMATION

CROSS REFERENCE TO RELATED APPLICATION

This application is a continuation of my copending Ser. No. 732,248 filed May 27, 1968 and now abandoned.

BACKGROUND OF THE INVENTION

1. Field of the Invention

This invention relates to a magnetic recording method and device for precise graduation.

2. Description of the Prior Art

Machine tools, for example, must be equipped with a precise scale for processing use, and the precision of the machine tools is determined by the precision of the scale and, therefore, the precision of the scale is of prime importance in the art. One scale that has heretofore been used is a magnetic scale which has reference divisions, commonly referred to as magnetic grating, formed by recording, for example, rectangular or sinusoidal signals of a certain wavelength on a glass or metal strip which has magnetic powder deposited thereon.

However, large or bulky machine tools require the use of long and precise scales. Such long and precise scales encounter difficulties in fabrication, in carrying, shipping and in mounting operations and so on. To avoid these difficulties, it is the practice in the art that a plurality of short precise scales jointed together are mounted on large-sized machine tools, but this conventional method presents a problem as it is extremely difficult to join the scales within an error of several microns. Accordingly, it is highly desirable that precise graduation be possible after mounting of the scale members on the machine tools.

SUMMARY OF THE INVENTION

It is one object of this invention to provide a recording method and device which can be used with large-sized or bulky machine tools.

It is another object of this invention to provide a recording method and device which can be used for measuring the mechanical precision of magnetic recording and reproducing devices.

Other objects, features and advantages of this invention will become apparent from the following description taken in conjunction with the accompanying drawings, wherein like reference numerals throughout the various views of the drawings are intended to designate similar elements or components.

BRIEF DESCRIPTION OF THE DRAWINGS

FIG. 1 is a schematic diagram illustrating one example of this invention;

FIG. 2 is a schematic diagram showing one example of a scale member employed in this invention;

FIG. 3a is a cross-sectional view taken along the line IIIa—IIIa in FIG. 1;

FIG. 3b is a fragmentary side view of FIG. 1;

FIG. 4 is a plan view showing one example of a fine-control unit of the right head illustrated in FIG. 1;

FIGS. 5 and 6 are diagram waveforms for explaining this invention; and

FIG. 7 is a schematic diagram showing another example of this invention.

DESCRIPTION OF THE PREFERRED EMBODIMENTS

With reference to the drawings a detailed description will be given of one example of this invention.

In FIG. 1 there is illustrated one embodiment of a recording device produced according to this invention. Reference numeral 1 indicates a scale member consisting of a magnetic medium having reference division lines marked on one end portion A by precise magnetic grating as illustrated in FIG. 2. A writing head 4 is provided with a signal coil 5. Reference numeral 6 designates a mount on which a readout head 2 and the writing head 4 are mounted at a predetermined distance B from each other. The mount 6 is adapted to slide on a track 6' extended along the scale member 1. Reference character D identifies a detector circuit connected to the readout head 2, P a waveform shaping circuit for shaping the output of the detector circuit D into a rectangular signal and R an amplifier circuit for amplifying the output of the waveform shaping circuit P and applying the amplified output to the writing head 4. It is preferred that the readout head 2 and the writing head 4 are multi-gap heads such as disclosed in my U.S. Pat. No. 3,308,449.

As shown in that patent, the gaps of the head are spaced by a multiple of $\lambda_o/2$, where $\lambda_o$ is the spacing between the individual lines of the recorded information.

FIGS. 3a and 3b illustrate one example of a structure for sliding the mount 6 on the track 6', in which reference numeral 7 indicates a spacer for securing the readout head 2 to the mount 6 and 7' another spacer for slidably disposing the writing head 4 on the mount 6. That is, the mount 6 is engaged with the dovetailed portion of the track 6' in a manner to slide along the scale member 1, and the writing head 4 can be finely adjusted in the lengthwise direction of the track 6' so as to be spaced apart from the readout head 2 exactly at a predetermined distance B.

FIG. 4 shows one example of a structure for fine adjustment of the writing head 4 in which reference numeral 8 designates a rod formed of a nonmagnetic material and fixed to the lower end of the writing head 4, 9 and 9' projections provided on the mount 6 and 10 and 10' pins which are inserted into apertures 11 and 11' bored through the one projection 9' and fixed to the other projection 9 through holes 12 and 12' which are formed in the rod 8 in a manner to slidably support the rod 8. Reference numeral 13 identifies a plate spring interposed between the projection 9 and the rod 8, which always pushes the rod 8 to the right as seen on the drawing. Reference numeral 14 indicates a screw for fine control. The screw 14 is screwed in from the side of the projection 9' and pushes the side of the rod 8 against the plate spring 13 to control the position of the writing head 4. In FIG. 3b the spacer 7' is fixed and its contact face with the writing head 4 is formed to be slidable.

With such an arrangement, the reference divisions, formed by magnetic grating previously recorded on the portion A of the scale member 1 are read out by the readout head 2 and is then written on another portion of the scale member 1 by the writing head 4. Accordingly, accurate graduation can be effected on the right side of the portion A of the scale member 1 at the same pitch as that on the portion A by sequentially sliding the mount 6 on the track 6', and in this case, the distance B between the readout head 2 and the writing head 4 is selected to be $m\lambda_o$ where the distance or pitch of the reference division lines previously recorded is $\lambda_o$ and $m$ is an integer. This allows precise graduation to be effected on a long scale member and hence enables graduation even after the scale member has been mounted on, for example, a large-sized machine tool, thus eliminating the difficulties experienced in the prior art.

Let it be assumed that the length of the scale member 1 is L, the distance B between the readout head 2 and the writing head 4 is $m\lambda_o$ and the length of the portion A is greater than the distance B. In this case, an error of the scale caused by the shift of the reference divisions on the portion A results from, firstly, an error of the distance B between the readout head 2 and the writing head 4 : $(B = m\lambda_o + \epsilon\lambda_o)$ where $\epsilon$ is the error, and secondly, an error of the divisions recorded on the portion A, if neglecting an error due to play of a machine tool employed. These errors appear on a cycle of the distance B in any case, so that when no error exists in the divisions on the portion A as in the first case and $B = m\lambda_o + \epsilon\lambda_o$, an error of $\epsilon\lambda_o$ increases in a stepwise manner at every cycle of B, thus producing an error of $N\epsilon\lambda_o$ in the end, as shown in FIG. 5.

This error can be corrected by rewriting the divisions after measuring the error over the entire length of the scale member to find out $\epsilon$ and adjusting the distance $B$ correspondingly.

The error due to the second case repeats on a cycle of $B$ but does not accumulate, as depicted in FIG. 6, and in general this error is as small as several microns and hence does not matter. Further, when the readout head 2 is a multi-gap head, there is a tendency that small errors are cancelled by the averaging action of the head. Since this effect is repeated at every cycle of $B$, errors decrease as the end of the scale member is approached. With the recording device and method of this invention, substantially no error is introduced in graduation by means of recording, and since graduation can be achieved after a plurality of short scale members have been joined together and there is no possibility that errors are caused at the joints of the scale members. In addition, the divisions are sometimes recorded on the joints of the scale members, but the use of the aforementioned multi-gap head allows reproduction of the recorded signals over a plurality of wavelengths thereof and accordingly no problem is presented in this point.

Therefore, according to this invention, metal, glass or like strips of a suitable length may be joined together as one assembly to form a magnetic gradient having precise graduations. Instead of such strip, a long ribbonlike (tape-like) scale member may be used, which is fixed at both ends to a support in a taut condition, and the support is attached to a machine tool. In this case, it is preferred to attach a cushion member, formed of a material such as commercially known under the name of "MOLTOPEN," to the back of the ribbon, and since the length of the divisions becomes inaccurate when the ribbon is stretched, the graduation by means of recording should be effected with the ribbon being subjected to the predetermined desired tension. It is also possible that the scale member is wound just like a tape measure with the reference divisions being recorded on the top end portion thereof.

FIG. 7 illustrates another example of this invention, in which case a graduated scale member 15 is placed in parallel with a scale member 1' to be graduated. A track 6' is disposed in parallel between the scale members 15 and 1', by means of which a readout head 2 and a writing head 4 are slid along the scale members. That is, the readout head 2 is disposed in contact with the graduated scale member 15 and the writing head 4 is placed in engagement with the scale member 1', under which conditions the reference divisions recorded on the portion A of the scale member 15 are transferred onto the scale member 1'. For this purpose, a coupler 17 is employed and coupling rods 16 and 16' are attached thereto, on which the writing head 4 and the readout head 2 are respectively mounted. After the reference divisions have thus been recorded on the scale member 1', precise graduation is carried out on the scale member 1' by the use of the device and method depicted in FIG. 1. This allows exact graduation of a scale member held in taut condition and hence eliminates the possibility of introducing inaccuracy due to stretching of the scale member as in the case of the reference divisions being previously provided on the predetermined portion of the scale member. Substantially no error is caused by expansion of the scale member by selecting its expansion coefficient to be the same as that of the machine tool employed.

The foregoing has described only several examples of this invention and that various modifications may be effected in the construction of the device, the scale member and so on, if necessary, without departing from the novel concept of this invention. Further, this invention is applicable not only to the making of a long and precise scale but also to the making of a standard scale by precisely recording thereon one portion of the divisions of an original standard scale. In addition, this invention enables graduation of a cylindrical drum and is suitable for use in the case where signals of certain intervals are exactly recorded on a magnetic tape or the like. In the latter case, alternating current of constant frequency is usually recorded on the tape which is driven at a constant speed, but precision with an error of less than $10^{-3}$ cannot be expected because of wow and flutter. In the case of the magnetic scale, however, precision with an error of less than $10\mu$ per 1 m. can easily be obtained, so that if stretch of the tape is negligible, uniform recording with an error of $10^{-5}$ is possible. This is a very effective means for measuring wow and flutter of tape recorders.

I claim:

1. An apparatus for the magnetic recording of gradient information onto magnetic media, comprising:
   a length of recorded gradient information equal to $m\lambda_o$, where $m$ is an integer and $\lambda_o$ is the distance between lines of said gradient;
   a support;
   a first multi-gap head secured to said support; said head having gaps therein spaced by a distance which is a multiple of $\lambda_o/2$;
   a second head secured to said support and spaced from said first magnetic head a distance equal to $n\lambda_o$, where n is less than m, said first and second magnetic heads positioned magnetically adjacent said length of recorded gradient information;
   a member of magnetic material extending from said length of recorded gradient information and formed integrally therewith;
   means for moving said support relative to said member; means electrically connected between said first and second magnetic heads, whereby movement of said first magnetic head along the length of said recorded gradient will record a second length of gradient information onto said member immediately adjacent said length of recorded gradient information.

2. An apparatus for the magnetic recording of gradient information onto magnetic media according to claim 1 further including means connected between said second head and said support to adjustably position said second head so as to obtain the distance $n\lambda_o$.

3. An apparatus for the magnetic recording of gradient information onto magnetic media according to claim 1 wherein said means electrically connected between said first and second magnetic heads includes a detector having an input connected to said first magnetic head and an output, a waveform shaping circuit having the input thereof connected to the output of said detector and further having an output, and an amplifier having the input thereof connected to the output of said waveform shaping circuit and the output of said amplifier connected to said second magnetic head.

4. An apparatus for the magnetic recording of gradient information onto magnetic media according to claim 1 wherein said predetermined distance between said first and second magnetic heads is less than the length of the recorded gradient information on said member.

5. A method for the magnetic recording of gradient information onto magnetic media including the steps of sequentially sensing magnetic gradient information from a predetermined length of magnetic material containing such information in increments spaced by a distance $\lambda_o$ by means of a multi-gap head having its gaps separated by a multiple of $\lambda_o/2$, and recording the length of recorded gradient information so sensed onto said magnetic material immediately adjacent said length of magnetic gradient information.

\* \* \* \* \*